(12) United States Patent
Lisseman et al.

(10) Patent No.: US 9,580,012 B2
(45) Date of Patent: Feb. 28, 2017

(54) VEHICLE OBJECT DETECTION AND NOTIFICATION SYSTEM

(71) Applicant: TK Holdings Inc., Auburn Hills, MI (US)

(72) Inventors: Jason Lisseman, Shelby Township, MI (US); Len Cech, Brighton, MI (US); Paul Smith, Auburn Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/635,547

(22) Filed: Mar. 2, 2015

(65) Prior Publication Data

US 2016/0257248 A1 Sep. 8, 2016

(51) Int. Cl.

| *B60Q 1/26* | (2006.01) |
|---|---|
| *B60Q 9/00* | (2006.01) |
| *B62D 1/04* | (2006.01) |
| *G08G 1/16* | (2006.01) |
| *B60Q 3/02* | (2006.01) |
| *B60K 37/06* | (2006.01) |
| *B60K 35/00* | (2006.01) |

(52) U.S. Cl.
CPC .............. *B60Q 9/00* (2013.01); *B60K 35/00* (2013.01); *B60K 37/06* (2013.01); *B60Q 3/024* (2013.01); *B62D 1/046* (2013.01); *G08G 1/167* (2013.01); *B60K 2350/1096* (2013.01); *B60K 2350/928* (2013.01); *B60Q 9/008* (2013.01)

(58) Field of Classification Search
CPC ........ B60K 37/06; B60K 35/00; G08B 21/06; G08G 1/167; B62D 1/046; B60Q 3/24

USPC ....... 340/438, 576, 459, 468, 458, 435, 433; 180/400, 315; 701/41, 36, 1
See application file for complete search history.

(56) References Cited

U.S. PATENT DOCUMENTS

| 4,664,127 A | 5/1987 | Ikeyama et al. |
|---|---|---|
| 4,993,281 A | 2/1991 | Miller |
| 5,516,143 A | 5/1996 | Lang et al. |
| 5,558,364 A | 9/1996 | Davis |
| 5,666,102 A | 9/1997 | Lahiff |
| 6,190,026 B1 | 2/2001 | Moore |

(Continued)

FOREIGN PATENT DOCUMENTS

| CN | 101639181 | 2/2010 |
|---|---|---|
| CN | 201487849 | 5/2010 |

(Continued)

OTHER PUBLICATIONS

U.S. Appl. No. 14/061,397, filed Oct. 23, 2013.

(Continued)

*Primary Examiner* — Hoi Lau
(74) *Attorney, Agent, or Firm* — Meunier Carlin & Curfman LLC

(57) ABSTRACT

Disclosed and described herein is a vehicle object notification system comprising a steering interface that includes a plurality of light-emitting elements, each of the light-emitting elements arranged in an elongated pattern along a respective portion of the steering interface, wherein a first light emitting element is configured to illuminate based on a detection of an object relative to a first portion of a vehicle and a second light emitting element is configured to illuminate based on a detection of an object relative to a second portion of a vehicle.

15 Claims, 6 Drawing Sheets

(56) References Cited

U.S. PATENT DOCUMENTS

| | | |
|---|---|---|
| 6,296,380 B1 | 10/2001 | Dawli |
| 6,538,405 B1 | 3/2003 | Brzozowski et al. |
| 6,668,682 B1 | 12/2003 | Emeneth et al. |
| 6,703,999 B1 | 3/2004 | Iwanami |
| 6,768,067 B2 | 7/2004 | Adachi et al. |
| 7,173,536 B2 | 2/2007 | Duval |
| 7,414,520 B2* | 8/2008 | Meißner ............ B60K 37/06 116/36 |
| 7,468,656 B1* | 12/2008 | Frank ............ B60Q 1/0082 340/468 |
| 7,525,449 B1 | 4/2009 | Lafontaine |
| 7,602,278 B2 | 10/2009 | Prost-Fin et al. |
| 7,605,693 B2 | 10/2009 | Kulas |
| 7,605,694 B2 | 10/2009 | Prost-Fin et al. |
| 7,672,759 B1 | 3/2010 | Lafontaine |
| 7,679,495 B2* | 3/2010 | Beutnagel-Buchner B62D 1/046 116/31 |
| 7,680,574 B2 | 3/2010 | Berg et al. |
| 7,710,279 B1* | 5/2010 | Fields ............ G08B 21/06 340/309.16 |
| 7,786,886 B2 | 8/2010 | Maruyama et al. |
| 7,987,030 B2 | 7/2011 | Flores et al. |
| 7,997,612 B2 | 8/2011 | Gulde |
| 8,061,861 B2 | 11/2011 | Paxton et al. |
| 8,067,709 B2 | 11/2011 | Han et al. |
| 8,136,425 B2 | 3/2012 | Bostick |
| 8,210,564 B2 | 7/2012 | Helmstetter et al. |
| 8,645,001 B2* | 2/2014 | Basson ............ G08G 1/167 359/22 |
| 9,134,729 B1 | 9/2015 | Szybalski et al. |
| 9,159,221 B1* | 10/2015 | Stantchev ............ G08C 17/02 |
| 9,233,638 B2* | 1/2016 | Lisseman ............ B60Q 3/024 |
| 9,308,856 B2* | 4/2016 | Lisseman ............ B62D 1/046 |
| 9,308,857 B2* | 4/2016 | Lisseman ............ B60Q 3/024 |
| 2003/0121360 A1 | 7/2003 | Hussy |
| 2004/0267422 A1* | 12/2004 | Bossler ............ B62D 1/06 701/41 |
| 2005/0189159 A1* | 9/2005 | Weber ............ B62D 1/046 180/315 |
| 2006/0044144 A1* | 3/2006 | Duval ............ A61B 5/14546 340/576 |
| 2006/0070795 A1* | 4/2006 | Meissner ............ B60K 37/06 180/446 |
| 2006/0236807 A1 | 10/2006 | Yasuda et al. |
| 2006/0241818 A1* | 10/2006 | Kumon ............ B60K 35/00 701/1 |
| 2006/0271261 A1* | 11/2006 | Flores ............ B60Q 3/0233 701/49 |
| 2007/0010944 A1* | 1/2007 | Ferrebee, Jr. ........ G08G 1/166 701/301 |
| 2007/0173983 A1* | 7/2007 | Takahashi ............ B60R 1/00 701/1 |
| 2007/0260375 A1* | 11/2007 | Hilton ............ G01M 17/007 701/33.4 |
| 2008/0023253 A1* | 1/2008 | Prost-Fin ............ B60K 35/00 180/400 |
| 2008/0080741 A1* | 4/2008 | Yokoo ............ B60W 40/09 382/104 |
| 2008/0202282 A1 | 8/2008 | Bassett et al. |
| 2008/0211651 A1* | 9/2008 | Beutnagel-Buchner B62D 1/046 340/459 |
| 2009/0063053 A1* | 3/2009 | Basson ............ G08G 1/167 702/1 |
| 2009/0189373 A1* | 7/2009 | Schramm ............ B60K 35/00 280/731 |
| 2009/0223321 A1 | 9/2009 | Stefani |
| 2009/0319095 A1 | 12/2009 | Cech et al. |
| 2010/0107806 A1 | 5/2010 | Corinaldi et al. |
| 2010/0218641 A1 | 9/2010 | Neumann et al. |
| 2010/0295670 A1* | 11/2010 | Sato ............ B60Q 3/042 340/458 |
| 2011/0153160 A1 | 6/2011 | Hesseling et al. |
| 2011/0187518 A1* | 8/2011 | Strumolo ............ B60Q 1/00 340/438 |
| 2011/0198201 A1 | 8/2011 | Chuang |
| 2011/0198999 A1 | 8/2011 | Honma et al. |
| 2012/0150387 A1 | 6/2012 | Watson et al. |
| 2012/0267222 A1 | 10/2012 | Gohng et al. |
| 2013/0082874 A1* | 4/2013 | Zhang ............ G01S 5/0072 342/357.31 |
| 2013/0152721 A1 | 6/2013 | Trendov et al. |
| 2013/0245886 A1* | 9/2013 | Fung ............ B60K 28/06 701/36 |
| 2014/0081521 A1* | 3/2014 | Frojdh ............ G06F 3/017 701/36 |
| 2014/0109719 A1* | 4/2014 | Lisseman ............ B60Q 3/024 74/552 |
| 2014/0111324 A1* | 4/2014 | Lisseman ............ B62D 1/046 340/435 |
| 2014/0111325 A1* | 4/2014 | Lisseman ............ B60Q 3/024 340/435 |
| 2014/0232538 A1* | 8/2014 | Sobue ............ B60R 1/00 340/435 |
| 2014/0240114 A1* | 8/2014 | Waeller ............ B60Q 9/008 340/435 |
| 2014/0244115 A1 | 8/2014 | Sanma et al. |
| 2014/0375785 A1 | 12/2014 | Kogut et al. |
| 2016/0200246 A1* | 7/2016 | Lisseman ............ B60Q 3/024 701/36 |
| 2016/0200343 A1* | 7/2016 | Lisseman ............ B62D 1/046 701/36 |
| 2016/0257248 A1* | 9/2016 | Lisseman ............ B60Q 9/00 |

FOREIGN PATENT DOCUMENTS

| | | |
|---|---|---|
| CN | 102066181 A | 5/2011 |
| EP | 0801373 A1 | 10/1997 |
| JP | 2005/088792 | 4/2005 |
| JP | 2009018722 A | 1/2009 |
| WO | 9803365 A1 | 1/1998 |
| WO | 02096745 A1 | 12/2002 |
| WO | 2005025936 A2 | 3/2005 |
| WO | 2006/127835 | 11/2006 |
| WO | 2009111098 A2 | 9/2009 |
| WO | 2010/051090 | 5/2010 |
| WO | 2010/087931 | 8/2010 |

OTHER PUBLICATIONS

Notice of Allowance, dated Sep. 9, 2015, received in connection with U.S. Appl. No. 14/061,397.
Non-final Office Action, dated Mar. 13, 2015, received in connection with U.S. Appl. No. 14/061,397.
U.S. Appl. No. 14/061,383, filed Oct. 23, 2013.
Final Office Action, dated Aug. 25, 2015, received in connection with U.S. Appl. No. 14/061,383.
Non-final Office Action, dated Feb. 18, 2015, received in connection with U.S. Appl. No. 14/061,383.
U.S. Appl. No. 14/061,408, filed Oct. 23, 2013.
Final Office Action, dated Aug. 25, 2015, received in connection with U.S. Appl. No. 14/061,408.
Non-final Office Action, dated Feb. 18, 2015, received in connection with U.S. Appl. No. 14/061,408.
U.S. Appl. No. 14/806,325, filed Jul. 22, 2015.
International Preliminary Report on Patentability and Written Opinion, dated Apr. 28, 2015, received in connection with International Patent Application No. PCT/US2013/066329.
International Preliminary Report on Patentability and Written Opinion, dated Apr. 28, 2015, received in connection with International Patent Application No. PCT/US2013/066330.
International Preliminary Report on Patentability and Written Opinion, dated Apr. 28, 2015, received in connection with International Patent Application No. PCT/US2013/066399.
Design U.S. Appl. No. 29/524,993, filed Apr. 24, 2015.
Design U.S. Appl. No. 29/524,998, filed Apr. 24, 2015.
Design U.S. Appl. No. 29/525,000, filed Apr. 24, 2015.

(56) References Cited

OTHER PUBLICATIONS

PCT/US2013/066329, filed Oct. 23, 2013, International Search Report and Written Opinion dated Feb. 7, 2014.
PCT/US2013/066330, filed Oct. 23, 2013, International Search Report and Written Opinion dated Feb. 7, 2014.
PCT/US2013/066399, filed Oct. 23, 2013, International Search Report and Written Opinion dated Feb. 7, 2014.
Office Action issued in Chinese Application No. 201380055405.9, dated Jun. 2, 2016.
Office Action issued in Chinese Application No. 201380055394.4, dated Jun. 28, 2016.
Office Action issued in Chinese Application No. 201380055391.0, dated Jul. 29, 2016.
Non Final Office Action dated Sep. 20, 2016, issued in related Application No. 15/075,519.
Non-Final Office Action dated Sep. 20, 2016, issued in related Application No. 15/075,527.

\* cited by examiner

VEHICLE OBJECT DETECTION AND NOTIFICATION SYSTEM

TECHNICAL FIELD

The present disclosure relates generally to object detection and notification systems for vehicles and, more particularly, to solutions for integrating delivery of object detection information with vehicle control/steering systems.

BACKGROUND

Many modern mobile machines and vehicles are equipped with object detection and collision avoidance systems. For example, many modern automobiles include a collision avoidance system that includes a rear-facing, vehicle-mounted video camera that is connected to an in-dash multi-function display monitor. When the vehicle is placed in reverse, the collision avoidance system automatically activates the camera and displays the corresponding video feed on the in-dash display, providing the driver with rear visibility, with a greater field of vision than is generally provided by the rear-view mirror(s). Some collision avoidance systems also include additional safety measures, such as proximity alarms for notifying the driver of nearby objects and auto-braking schemes for causing the vehicle to automatically brake when the vehicle moves to within a threshold distance of a nearby object.

Although conventional collision avoidance systems may be convenient when the vehicle is moving, particularly when the vehicle is travelling in reverse or other situations in which driver visibility is impeded by driver "blind-spots," there a several drawbacks. First, many interactive display technologies used in conventional collision avoidance systems require a relatively high level of driver attentiveness, which can distract the driver from other, potentially hazardous situations. For example, requiring the driver to look at a dash-mounted video screen while backing up into a busy street may distract the driver from pedestrian or vehicle traffic travelling toward the sides of the vehicle. As a result, although the video monitoring system may keep the driver keenly apprised of hazards approaching from behind the vehicle, the level of attention required to for the driver to process full-motion video may actually serve to distract the driver from other potential hazards near the vehicle.

In addition to driver distraction, closed-circuit display technologies used in many conventional collision avoidance systems can be costly. For example, many driver awareness camera system options can add 10-20% to the cost of a standard vehicle. While this may be acceptable in luxury markets or other environments where such a cost premium can be justified, it may be cost-prohibitive in many situations, such as fleet vehicles for local governments and small companies.

Various implementations of vehicle object detection and notification systems and corresponding information delivery methods disclosed herein are directed to overcoming one or more of the problems set forth above and/or other problems in the art.

SUMMARY

According to various implementations, a vehicle object notification system includes a steering interface that includes a plurality of light-emitting elements. Each of the light-emitting elements is arranged in an elongated pattern along a respective portion of the steering interface. A first light emitting element is configured to illuminate based on a detection of an object relative to a first portion of a vehicle, and a second light emitting element is configured to illuminate based on a detection of an object relative to a second portion of a vehicle. In some implementations, the first light emitting element may be arranged in an elongated pattern along a rim portion of the steering interface and is configured to illuminate when the object is located in front of the vehicle. The second light emitting element may be arranged in an elongated pattern along a hub portion of the steering interface and is configured to illuminate when the object is located behind the vehicle or underneath the vehicle. Alternatively, the second light-emitting element may be arranged in an elongated pattern along a second rim portion of the steering interface.

In some implementations, the first light-emitting element may include a plurality of regions that are each configured to selectively illuminate based on a respective location of the object relative to the first portion of the vehicle. In addition, the second light-emitting element may include a plurality of regions that are each configured to selectively illuminate based on a respective location of the object relative to the second portion of the vehicle.

Various other implementations include a vehicle object notification system that includes a steering interface, at least one light-emitting element coupled to the steering interface, and a controller communicatively coupled to the at least one light-emitting element. The light-emitting element is arranged in an elongated pattern along at least a portion of the steering interface. The controller is configured to: (1) receive information indicative of an object detected proximate the vehicle; (2) determine the location of the object relative to a portion of the vehicle based on the received information; and (3) provide, to the light-emitting element, a control signal for illuminating the light-emitting element according to an illumination pattern. The illumination pattern is based on the location of the object.

In some implementations, the vehicle object notification system may include a plurality of light-emitting elements. A first light-emitting element is arranged in an elongated pattern along a first portion of the steering interface, and a second light-emitting element may be arranged in an elongated pattern along a second portion of the steering interface. The first portion of the steering interface may include a rim portion, and the second portion of the steering interface may include a hub portion.

In some implementations, determining the location of the object relative to the portion of the vehicle may include determining the location of the object is in a first location relative to the portion of the vehicle, and providing the control signal to the light-emitting element may include providing the control signal to the first light-emitting element. The first location may include an area in front of the vehicle. In addition or as an alternative, determining the location of the object relative to the portion of the vehicle may include determining the location of the object is in a second location relative to the portion of the vehicle, and providing the control signal to the light-emitting element includes providing the control signal to the second light-emitting element. The second location may include at least one of an area behind the vehicle or underneath the vehicle.

In certain implementations, the first light-emitting element may include a plurality of regions, and each region is configured to selectively illuminate based on a respective location of the object relative to a first portion of the vehicle. In addition, the second light-emitting element may include a plurality of regions, and each region is configured to selectively illuminate based on a respective location of the object relative to a second portion of the vehicle.

Various implementations are directed to a vehicle that includes one or more ground-engaging devices, a steering interface coupled to one or more ground-engaging devices, at least one light-emitting element coupled to the steering interface, and a controller communicatively coupled to the light-emitting element. The steering interface includes a rim portion and a hub portion, and the rim portion is configured for grasping by an operator of the vehicle. The light-emitting element is arranged in an elongated pattern along at least a portion of at least one of the rim portion and the hub portion. The controller is configured to: (1) receive information indicative of an object detected proximate the vehicle; (2) determine the location of the object relative at a portion of the vehicle, based on the received information; and (3) providing, to the light-emitting element, a control signal for illuminating the light-emitting element according to an illumination pattern. The illumination pattern is based on the location of the object.

In certain implementations, the light-emitting element may include a plurality of light-emitting elements. A first light-emitting element may be arranged in an elongated pattern along a first portion of the steering interface, and a second light-emitting element may be arranged in an elongated pattern along a second portion of the steering interface. The first portion of the steering may include a rim portion, and the second portion of the steering interface may include a hub portion. In addition, in some implementations, determining the location of the object relative to the portion of the vehicle includes determining the location of the object is in a first location relative to the portion of the vehicle, and providing the control signal to the light-emitting element includes providing the control signal to the first light-emitting element. The first location may include an area in front of the vehicle.

In addition, in certain implementations, determining the location of the object relative to the portion of the vehicle may include determining the location of the object is in a second location relative to the portion of the vehicle, and providing the control signal to the light-emitting element may include providing the control signal to the second light-emitting element. The second location may include at least one of an area behind the vehicle or underneath the vehicle.

The first light-emitting element may include a plurality of regions, and each region may be configured to selectively illuminate based on a respective location of the object relative to a first portion of the vehicle. In addition, the second light-emitting element may include a plurality of regions, and each region may be configured to selectively illuminate based on a respective location of the object relative to a second portion of the vehicle.

BRIEF DESCRIPTION OF THE DRAWINGS

The device is explained in even greater detail in the following exemplary drawings. The drawings are merely exemplary to illustrate the structure of preferred devices and certain features that may be used singularly or in combination with other features. The invention should not be limited to the implementations shown.

DETAILED DESCRIPTION

According to various implementations, a vehicle object notification system includes a steering interface that includes a plurality of light-emitting elements. Each of the light-emitting elements is arranged in an elongated pattern along a respective portion of the steering interface. A first light emitting element is configured to illuminate based on a detection of an object relative to a first portion of a vehicle, and a second light emitting element is configured to illuminate based on a detection of an object relative to a second portion of a vehicle. In certain implementations, the first light emitting element may be arranged in an elongated pattern along a rim portion of the steering interface and is configured to illuminate when the object is located in front of the vehicle. The second light emitting element may be arranged in an elongated pattern along a hub portion of the steering interface and is configured to illuminate when the object is located behind the vehicle or underneath the vehicle. Alternatively, the second light-emitting element may be arranged in an elongated pattern along a second rim portion of the steering interface.

Figure 1:
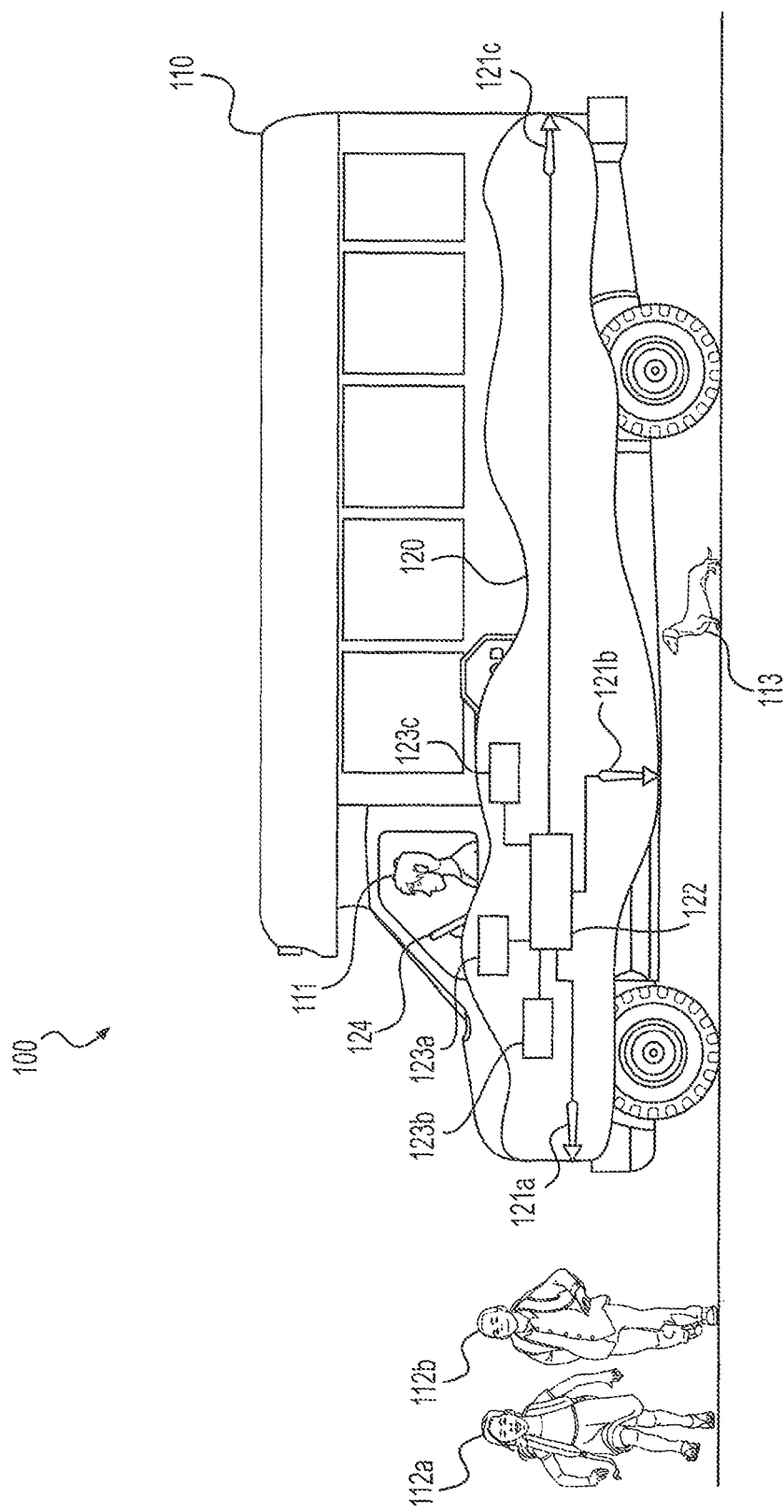
FIG. 1 illustrates a vehicle with a vehicle object notification system according to one implementation.

Certain exemplary implementations of the invention will now be described with reference to the drawings. In general, such implementations relate to a steering apparatus for a vehicle. FIG. 1 illustrates a vehicle 110 with a vehicle object notification system 120 according to one implementation 100. As shown in FIG. 1, the vehicle 110 can comprise one or more ground-engaging devices (shown as tires with rims in this vehicle, but can be runners, tracks, etc. in other types of vehicles). A steering interface 124 can be coupled to one or more ground-engaging devices. Generally, the steering interface 124 comprises at least a steering grip that can be configured for gripping to facilitate control of the vehicle. For example, the steering grip may be mounted on a non-rotatable component (not shown) such that the steering grip is rotationally movable about a steering axis. An exemplary non-rotatable component can include, for example, a steering column, which receives a steering spindle that extends along the steering axis and serves to transmit the rotational movement of the steering grip to the wheels or other ground-engaging devices of the motor vehicle. Rotational movement of the steering grip may be transmitted to the wheels by mechanical and/or electrical means. In an exemplary implementation, the steering grip can include a single continuous grip portion or any number of unique grip sections. For example, the steering grip can include an annular ring shape with an outer contour that is essentially circular in shape. In an alternate implementation, the steering grip can define any suitable shape including, for example, circular, elliptical, semi-circular or semi-elliptical, square, rectangular, or any other regular or irregular shape. In addition, in some implementations, the steering grip may include two or more semi-circular, semi-elliptical, semi-rectangular, or other regular or irregular shaped portions. For example, in one implementation, the steering grip may include two semi-circular sections (e.g., resembling a flight yoke).

Though not visible in FIG. 1, in some implementations the steering interface 124 can further comprise a rim portion and a hub portion, the rim portion configured for grasping by an operator 111 of the vehicle 110. Further comprising the implementation 100 shown in FIG. 1 can be a controller 122. The controller 122 can be communicatively coupled to at least one light-emitting element coupled to the steering interface 124, the at least one light-emitting element arranged, for example, in an elongated pattern along at least a portion of at least one of the rim portion and the hub portion of the steering interface 124.

The controller 122 may be configured to direct operation of the at least one light-emitting element. The controller 122 can be associated with the steering interface 124. In an exemplary implementation, the controller 122 may be located on or proximate the at least one light-emitting element. In an alternative implementation, the controller 122 may be located on or otherwise associated with the electronic control unit of the vehicle 110. In a further implementation, the controller 122 may be located on or otherwise associated with another vehicle system. Where the controller 122 is associated with a system other than the steering interface, wired and/or wireless communication lines (i.e., data and/or power wires (including fiber optic), radio frequency, Wi-Fi (IEEE 802.11 (any variant), Bluetooth, etc.) may be provided from the alternate system to the light element 104. For example, the at least one light-emitting element may be connected to the vehicle's electronic control unit (ECU) by a wire run from the ECU unit to the at least one light-emitting element. In a further example, particular zones on the at least one light-emitting element may communicate with a processor associated with a system other than the steering interface 124, and communication lines (i.e., data and/or power wires) may be provided from the alternate system to the zoned at least one light-emitting element.

In an exemplary implementation, the at least one light-emitting element and the controller 122 are connected in communication with the vehicle by at least two wires where the first wire may provide a power source to the at least one light-emitting element and the controller 122 and the second wire provides a data connection between the steering interface and the vehicle. In a further example, the at least one light-emitting element and the controller 122 may be connected in communication with the vehicle by two wires, one including multiple communication lines and the second wire including power source. For example, where the at least one light-emitting element includes 6 zones, the first wire may include 6 communication lines for directing the operation of the corresponding zones, and the second wire may be a power source for providing power to the at least one light-emitting element. The at least one light-emitting element and the controller 122 may, alternatively, be in communication with the vehicle at only a power source.

In an exemplary implementation, the controller 122 may be configured to receive information from the vehicle. Information received from the vehicle may include, for example, GPS (global positioning system) information, navigation information, foreign object proximity information, vehicle performance information, general warning information, course information, positioning information, blind spot warning and the like available from on-board sensors and systems such as cameras, radar, LIDAR (light detection and ranging) systems, vehicle communication system information, and any other information relevant to the operation of the vehicle, the status of the user, and/or the functioning of the steering interface 124.

Navigation information may include, for example, a preparation for course change (e.g., lane recommendation in anticipation of pending course change), a navigation course change (e.g., instructions for following determined route and/or notification that the determined route has been recalculated), and a distance to course change (e.g., distance to turn). Foreign object proximity information may include, for example, the distance and direction to an identified foreign object, the size of a foreign object, and the relative speed and direction of the foreign object. Foreign object information can also include foreign individual proximity information. For example, vehicle systems can be used to detect an unauthorized person's presence in/on/proximate the vehicle (e.g., sensors within the vehicle can detect the touch, weight/pressure, etc. of unauthorized individual in/on/proximate the vehicle). Example sensors might include capacitive sensors, pressure sensors, conductivity/resistivity sensors, and weight sensors. Foreign individual proximity information may be utilized in conjunction with any vehicle security/alarm system.

Vehicle performance information may include, for example, on/off operation of the vehicle, battery life/status, fuel level, fuel efficiency, engine RPM, vehicle oversteer, vehicle understeer, turbocharger/supercharger boost pressure, an electrical vehicle (eV) status, stop and go vehicle mode, steering interface 124 straight-ahead position, vehicle lateral acceleration, autonomous vehicle driving state information, adaptive cruise control state information, keyless entry (e.g., confirmation approved key fob detected), and keyless ignition operation, traction control, electronic stability control, braking control (e.g., anti-lock braking system control/status), active handling mode, vehicle track/race/competition mode. General vehicle warning information may include, for example, occupant restraint information, airbag status information, door or window open/ajar/closed, sunroof/moon roof open/ajar/closed, low tire pressure, vehicle audio system status (e.g., entertainment system, audio volume, equalizer display/function, speaker control (e.g., left, right, front, rear, etc.)), vehicle communication system status (e.g., incoming call, Bluetooth activated/connected, etc.), heating and air conditioning system (e.g., temperature, fan speed), other temperature control systems (e.g., heated/cooled steering wheel, headed/cooled seats, beverage coolers, oil heater, battery heater, transmission heater, etc.). Course information may include, for example, a measure of a course remaining (e.g., a racing lap time countdown as a binary clock, lap segments, time segments, etc.) and a measure of the course remaining/completed (e.g., quantity of racing laps).

Operation of the at least one light-emitting element may be directed in response to information received from the steering interface 124 and/or information received from the vehicle. The at least one light-emitting element may be used to provide information and warning signals to the driver of the vehicle. In a further implementation, the at least one light-emitting element may be used to provide an aesthetically pleasing/decorative effect. For example, the at least one light-emitting element may be used at vehicle start up to provide a decorative effect in addition to providing an indication to the driver of the vehicle's operation status.

Directing illumination of the at least one light-emitting element may include, for example, the on/off state of the at least one light-emitting element, intensity, design/pattern, on/off illumination cycle, color, or any other feature of the at least one light-emitting element that can be controlled or otherwise manipulated. In an exemplary implementation, the on/off status of the at least one light-emitting element can be controlled. For example, in an implementation including multiple of the at least one light-emitting element, the quantity of light-emitting elements illuminated at a given time can be used to indicate the magnitude and/or scale of the warning or event, the greater the number illuminated the greater the threat and/or importance of the warning/event. Similar to quantity, the intensity of the at least one light-emitting element can be used to indicate the magnitude and/or scale of the warning or event, the greater the light intensity the greater the threat and/or importance of the warning/event. The actual design/pattern can be used to convey a particular message to the driver (e.g., illuminated symbols, shapes, text, icons, etc.). Likewise, the design/pattern of illumination can be used to indicate the magnitude/scale of the warning or event. The on/off illumination cycle or frequency of illumination of the at least one light-emitting element can also be controlled to create a flashing or strobe-like effect. For example, a high frequency on/off illumination cycle may be used to indicate an important and/or time sensitive event to the driver such as an impact or collision warning. In a further example, when the at least one light-emitting element comprises an infrared (IR) illuminator, a strobed/flashing light signal may be used to illuminate the driver's eyes for use in camera-based driver monitoring systems. The operation of the exemplary IR illuminator-type light-emitting element may be timed in communication with a camera, or other sensing device, and a processor to capture an image of the driver's eyes or other portions of the driver's face and/or body. Moreover, the use of IR light-emitting diodes (LEDs) can be used to mitigate light reflection when the driver is wearing eye glasses.

The selection of the at least one light-emitting element for illumination at a certain position can also be used to indicate the relative position of the warning or event. For example, if the one or more objects are detected at the front driver's side section of the vehicle, the at least one light-emitting element at a corresponding position on the rim portion of the steering interface 124 (i.e., upper left quadrant) may be illuminated. Likewise, if the one or more objects are detected at behind or underneath the vehicle, the at least one light-emitting element at the hub portion of the steering interface 124 may be illuminated. Similarly, the on/off illumination cycle may be used to create a motion effect. The perceived direction of the light pattern can be used to indicate the relative direction of warning. For example, an on/off illumination pattern starting from the center of the steering interface 124 and progressing toward the left side of the interface 124 may create an illuminated wave-like effect toward the left that can be used to indicate a warning/event associated with the left side of the vehicle or an indication to the driver of a pending course change in a navigational setting.

The controller 122 can receive information indicative of one or more objects 112a, 112b, 113 detected on, in or proximate to the vehicle 110. Once information indicative of the objects 112a, 112b, 113 is received by the controller 122, the controller can determine the location of the one or more objects 112a, 112b, 113 relative to a portion of the vehicle 110, based on the received information. For example, the controller 122 can determine whether the one or more objects 112a, 112b, 113 are in front of the vehicle 110 (as children 112a, 112b are shown in FIG. 1), are underneath the vehicle 110 (as dog 113 is shown in FIG. 1), are behind the vehicle 110, are to any side of the vehicle 110, are above the vehicle 110, are in the vehicle 110 (and their location within the vehicle 110), are on the vehicle 110 (and location), are touching the vehicle 110 (and location), etc. The controller 122 can be communicatively coupled with one or more sensors 121a, 121b, 121c that can be used to provide the information indicative of the objects 112a, 112b, 113 to the controller 122. Example sensors 121a, 121b, 121c might include motion sensors, capacitive sensors, pressure sensors, conductivity/resistivity sensors, heat sensors, weight sensors, proximity sensors, and the like and combinations thereof. Alternatively or optionally, the controller may receive information from vehicle systems. Information received from the vehicle can include, for example, GPS information, on-board sensor information, camera information, communication system information, lane position information, and the like.

Upon determining the location of the one or more objects 112a, 112b, 113 relative to a portion of the vehicle 110, based on the received information, a control signal can be provided to the at least one light-emitting element for illuminating the at least one light-emitting element according to an illumination pattern, the illumination pattern based on the location of the one or more objects 112a, 112b, 113 relative to a portion of the vehicle 110.

Also, as shown in FIG. 1, in addition to the at least one light-emitting element coupled to the steering interface 124, the controller 122 may also be in communication with other vehicle systems such as, for example, a steering control system 123a, a vehicle braking system 123b, a warning system 123c such as, for example the vehicles anti-theft/security/alarm system and the like, which can further be comprised of audible, visual, haptic devices for making the vehicle operator 111 (or other passengers or persons) aware of the detection of one or more objects 112a, 112b, 113 relative to a portion of the vehicle 110. For example, steering may be locked or released through the steering control system 123a depending upon the presence or absence of one or more objects 112a, 112b, 113 relative to a portion of the vehicle 110. Similarly, brakes can be applied or released by the braking system 123b depending upon the presence or absence of one or more objects 112a, 112b, 113 relative to a portion of the vehicle 110. Further, alarms 210a can be sounded and/or warning lights operated through the vehicle's warning system 123c depending upon the presence or absence of one or more objects 112a, 112b, 113 relative to a portion of the vehicle 110. Similarly, the controller 122 may be connected with other vehicle systems to receive information or to operate or prevent operation of components of the vehicle depending upon the presence or absence of one or more objects 112a, 112b, 113 relative to a portion of the vehicle 110.

In one implementation, the at least one light-emitting element of the vehicle 110 can further comprise a plurality of light-emitting elements such as, for example, a first light-emitting element arranged in an elongated pattern along a first portion of the steering interface 124 and a second light-emitting element arranged in an elongated pattern along a second portion of the steering interface 124. For instance, the first portion of the steering interface having the first light-emitting element arranged in an elongated pattern can include a rim portion and the second portion of the steering interface having the second light-emitting element arranged in an elongated pattern can include a hub portion. In one non-limiting example, determining the location of the one or more objects 112a, 112b, 113 relative to the portion of the vehicle 110 can include determining the location of the one or more objects 112a, 112b, 113 is in a first location relative to the portion of the vehicle 110 and providing the control signal to the at least one light-emitting element includes providing the control signal to the first light-emitting element. In one implementation, the first location comprises an area in front of the vehicle 110. Likewise, determining the location of the one or more objects 112a, 112b, 113 relative to the portion of the vehicle 110 can include determining the location of the one or more objects 112a, 112b, 113 is in a second location relative to the portion of the vehicle 110 and providing the control signal to the at least one light-emitting element includes providing the control signal to the second light-emitting element. In one implementation, the second location comprises at least one of an area behind the vehicle 110 or underneath the vehicle 110.

Figure 2:
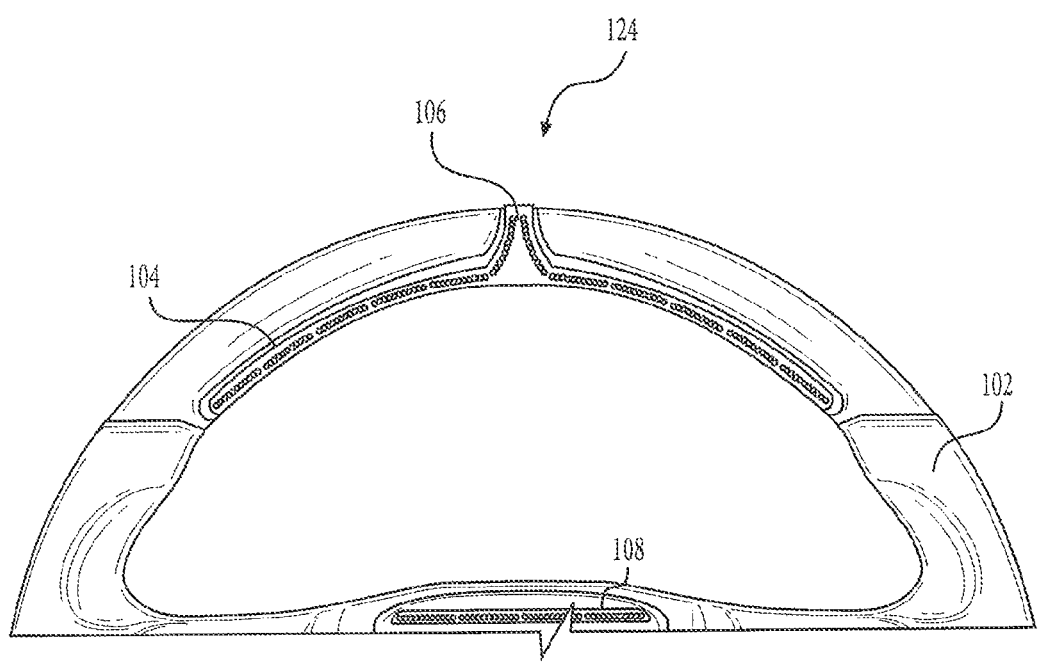
FIG. 2 illustrates a partial front view of a steering interface according to another implementation.

FIG. 2 illustrates a partial front view of a steering interface according to another implementation. In this exemplary implementation, the steering interface 124 includes one or more first light-emitting elements 104 for providing indication and/or warning light signals to the driver of the vehicle corresponding to detection of one or more objects 112a, 112b, 113 relative to a first portion of the vehicle 110 and one or more second light-emitting elements 108 corresponding to detection of one or more objects 112a, 112b, 113 relative to a second portion of the vehicle 110. The first and second light-emitting elements 104, 108 can include, for example, a liquid crystal display (LCD), thin-film-transistor display, active-matrix display, a segmented display (e.g., improved black nematic (IBN), super twisted nematic (STN), etc.), a light-emitting diode (LED), laser, halogen, fluorescent, an infra-red (IR) LED illuminator, or any other suitable light emitting element. In an alternate implementation, the first light-emitting element 104 or the second light-emitting element 108 can include a light pipe (not shown) having a start and end LEDs located at opposite ends of a (solid or hollow) molded plastic rod. The steering interface 124 can also include a reflective material or surface for recycling light emitted from the first or second light elements 104, 108 and can be used to direct light to the driver.

In an exemplary implementation, the first light-emitting element 104 or the second light-emitting element 108 can display a single color or multiple colors. For example, the exemplary LED can include a single color LED, a bi-color LED, and a tri-color LED. The first light-emitting element 104 and the second light-emitting element 108 do not have to display the same colors at the same time. The steering interface 124 can include a single first light-emitting element 104 or any number of first light-emitting elements 104. Similarly, the steering interface 124 can include a single second light-emitting element 108 or any number of second light-emitting elements 108. Moreover, different types of first light-emitting elements 104 and second light-emitting elements 108 may be implemented on the same steering apparatus 100. For example, a steering grip 102 may include both standard LEDs and IR LEDs and the first light-emitting element 104 can be comprised of a combination of the two types of LEDs as can the second light-emitting element 108.

As described herein, the first light-emitting element 104 can be located at any portion of the steering grip 102 and the second light-emitting element 108 can be located in any other portion of the steering interface 124. The first light-emitting element 104 can be located on an interior edge of the steering grip 102. In an alternate implementation, not shown, the first light-emitting element 104 can be located on an exterior edge of the steering grip 102. In an alternate implementation (not shown), the first light-emitting element 104 can be located on a front or back face of the steering grip 102. The first light-emitting element 104 can be provided in a direction defined by the perimeter/diameter of the steering grip 102. Similarly, the second light-emitting element 108 can be an elongated pattern defined along at least a portion of the hub portion of the steering interface 124. The first light-emitting element 104 and the second light-emitting element 108 can define any suitable shape including, for example, circular, elliptical, square, rectangular, or any other regular or irregular shape. For example, an exemplary first light-emitting element 104 can be provided with an elongated shape having curvilinear sides whereas an exemplary second light-emitting element 108 may lack the curvilinear sides. In an implementation provided in FIG. 2, the first light-emitting element 104 can include a vertical element 106 extending in a radial direction of the steering grip 102.

In a further implementation, the vertical element 106 can be used to indicate the relative position and threat level associated with a particular warning/event. As illustrated in FIG. 2, the vertical element 106 may include a plurality of light elements. When the vehicle is in a straight ahead orientation, the light elements centered in the vertical element 106 may be illuminated. Because the relative threat/warning level in the straight ahead position is minimal, the illuminated light elements in this position may be green. In response to detection of one or more objects in front of the vehicle or to the left or right side of the vehicle 110, the light elements on the left or right side, respectively, of the vertical element 106 are illuminated. For example, an initial indication that one or more objects are nearing the vehicle toward its left side may be provided by illumination of the light elements on the left side of the vertical section 106. These light elements may indicate a moderate threat/warning and may be provided, for example, by yellow illuminated light elements. As the objects move progressively closer to the left side of the vehicle, the light elements may change colors from yellow to red, indicating that the risk level associated with the one or more objects has escalated from moderate to severe and/or immediate. Further, as the object is approaching the light elements in the vertical section 106 may illuminate in a wave pattern suggesting the direction of the object and/or the proximity of the object to the vehicle. As a further example, the light elements in the vertical section 106 may illuminate in an illumination pattern, at a greater on/off frequency, at a particular quantity of light elements, with greater intensity, and/or varying colors as the direction and/or the proximity of the object to the vehicle change.

FIGS. 3A-3D illustrate front views of a steering interface 124 according to various implementations of the at least one light-emitting element of the vehicle 110 comprising a plurality of light-emitting elements such as, for example, a first light-emitting element 310 arranged in an elongated pattern along a first portion of the steering interface 124 and a second light-emitting element 320 arranged in an elongated pattern along a second portion of the steering interface 124.

Figure 3A:
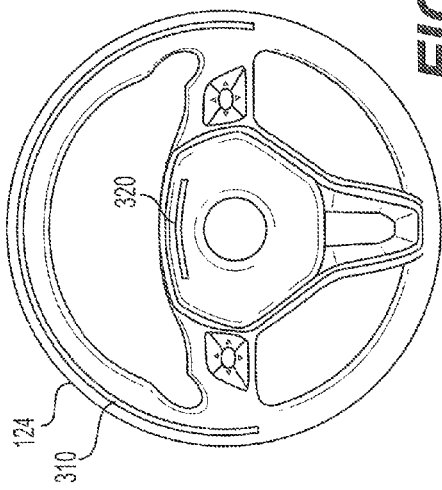
FIG. 3A illustrates a front view of a steering interface according to one implementation.
Figure 3C:
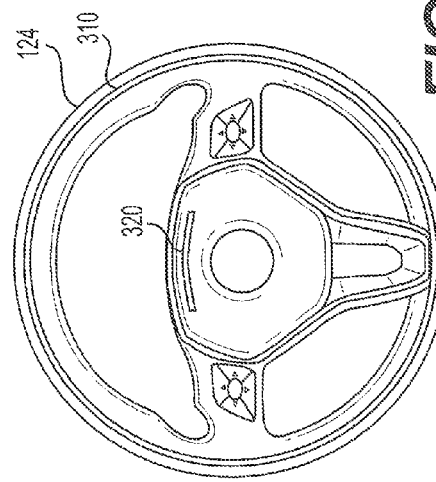
FIG. 3C illustrates a front view of a steering interface according to another implementation.
Figure 3B:
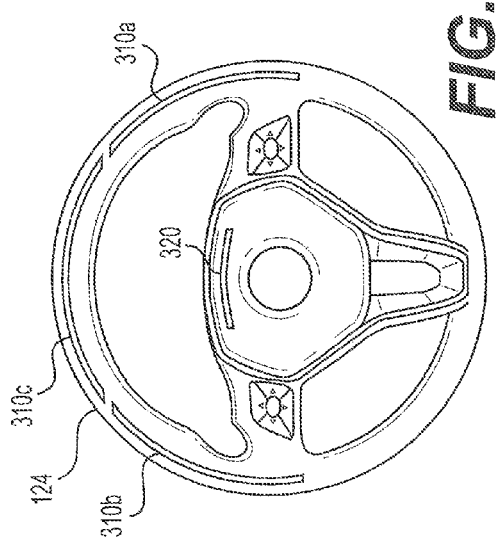
FIG. 3B illustrates a front view of a steering interface according to another implementation.
Figure 3D:
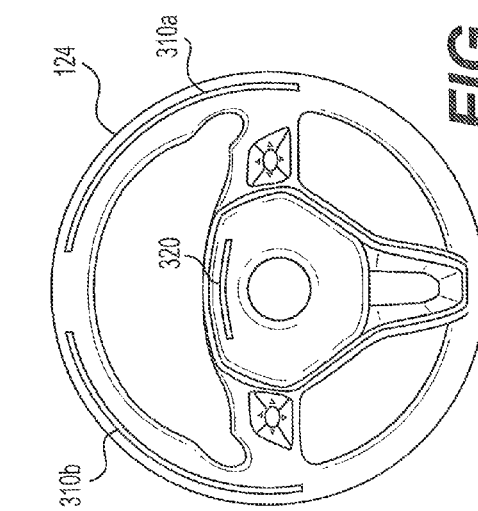
FIG. 3D illustrates a front view of a steering interface according to another implementation.

For example, as illustrated in FIG. 3A, the steering interface 124 may include a first single light emitting element 310 spanning the entire perimeter of the steering interface 124 thereby providing a 360° illumination system and a second elongated light-emitting element 320 in the hub of the steering interface 124. In an alternate implementation as illustrated in FIG. 3B, the steering interface 124 may include a first single light emitting element 310 along the upper half of the perimeter defined by the steering interface 124 and a second elongated light-emitting element 320 in the hub of the steering interface 124. In further implementations illustrated in FIGS. 3C-3D, the steering interface 124 may include multiple first light-emitting elements 310 and/or second light-emitting elements 320. Because the steering interface 124 may be constructed to withstand substantial loading in the event of a crash, a steering interface 124 including multiple first light-emitting elements 310 and/or second light-emitting elements 320 can provide for less likelihood that a first 310 or second 320 light-emitting element will break upon impact and/or airbag deployment. Moreover, locating multiple first light-emitting elements along the diameter of the steering interface 124, and in particular along the upper half of the steering interface rim, helps with the assembly process and improves the system's mechanical robustness to dynamic or static loading at the 12 o'clock position on the rim of the steering interface 124. As illustrated in FIG. 3C, the steering interface 124 may include multiple first light-emitting elements 310 along a first portion of the steering interface 124, including, for example, a portion of the first light-emitting element 310a may be located on a right portion of the steering interface diameter and a portion of the first light emitting element 310b may also be located on a left portion of the steering interface diameter. A second light-emitting element 320 arranged in an elongated pattern can be along a second portion of the steering interface 124. In this example, the second light-emitting element is located within the hub of the steering interface 124. In another implementation illustrated in FIG. 3D, the steering interface 124 may include three first light-emitting elements 310 along a first portion of the steering interface 124 and at least one second light-emitting element 320 arranged in an elongated pattern along a second portion of the steering interface 124. First light-emitting element 310a may be located on a right portion of the steering interface 124, first light-emitting element 310b on a left portion of the steering interface 124, first light-emitting element 310c on a top center portion of the steering interface 124, between first light-emitting elements 310a and 310b, and second light-emitting element 320 located in the hub of the steering interface 124. In a further implementation, not shown, the steering interface may include a first light-emitting element 310 and/or a second light-emitting element 320 located on a lower portion of the steering interface 124. Any number of locations and quantities of first light-emitting elements 310 and second light-emitting elements 320 are considered within the disclosed implementation.

In an exemplary implementation, each of the first light-emitting elements 310 and the second light-emitting elements 320 can include a single zone or multiple zones for directing operation of the light-emitting elements. For example, in an exemplary implementation, the first light-emitting element 310 or the second light-emitting element 320 may be controlled based on instructions provided to the corresponding zone of the first light-emitting element 310 or the second light-emitting element 320 from the controller 122. Each of the first light-emitting element 310 and the second light-emitting element 320 may include a single light source, such as one LED, or it may include multiple light sources, i.e., multiple LEDs. In an exemplary implementation, the controller can provide separate instructions to each of the individual LEDs within the same zone. For example, LEDs may light sequentially, blink, or different color LEDs may be operated based on instructions from the controller 122.

In an alternate implementation, each of the first light-emitting element 310 or the second light-emitting element 320 can include multiple zones, for example, two or more zones, each zone can be configured to receive separate operating instructions from the controller 122. In an exemplary implementation, the LEDs may be arranged into groups and each group of LEDs assigned a zone on the first light-emitting element 310 or the second light-emitting element 320. For example, the first light-emitting element 310 may include 36 LED-style lights. The exemplary first light-emitting element 310 may be divided into four zones, each zone associated with 9 LEDs. The first light-emitting element 310 can control operation of the LEDs in each of the four zones separately based on the instructions provided by the controller 122. Such "zone control" is also possible with the second light-emitting element 320.

In an alternate implementation, the first light-emitting element 310 or the second light-emitting element 320 can include a number of zones corresponding to the number of lights present on the light-emitting element 310, 320, where each zone provides operation instructions to its corresponding individual lights as received from the controller 122. For example, an exemplary first light-emitting element 310 may include 36 LED-style lights and 36 zones corresponding to each of the 36 LEDs. The controller 122 can individually control operation of each of the 36 LEDs based on instructions provided to each of the corresponding 36 zones. The second light-emitting element 320 can similarly be configured. Therefore, as described herein, the first light-emitting element 310 can include a plurality of zones or regions, each zone or region configured to selectively illuminate based on a respective location of the one or more objects relative to a first portion of the vehicle. Likewise, the second light-emitting element 320 can include a plurality of zones or regions, each zone or region configured to selectively illuminate based on a respective location of the one or more objects relative to a second portion of the vehicle.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4:
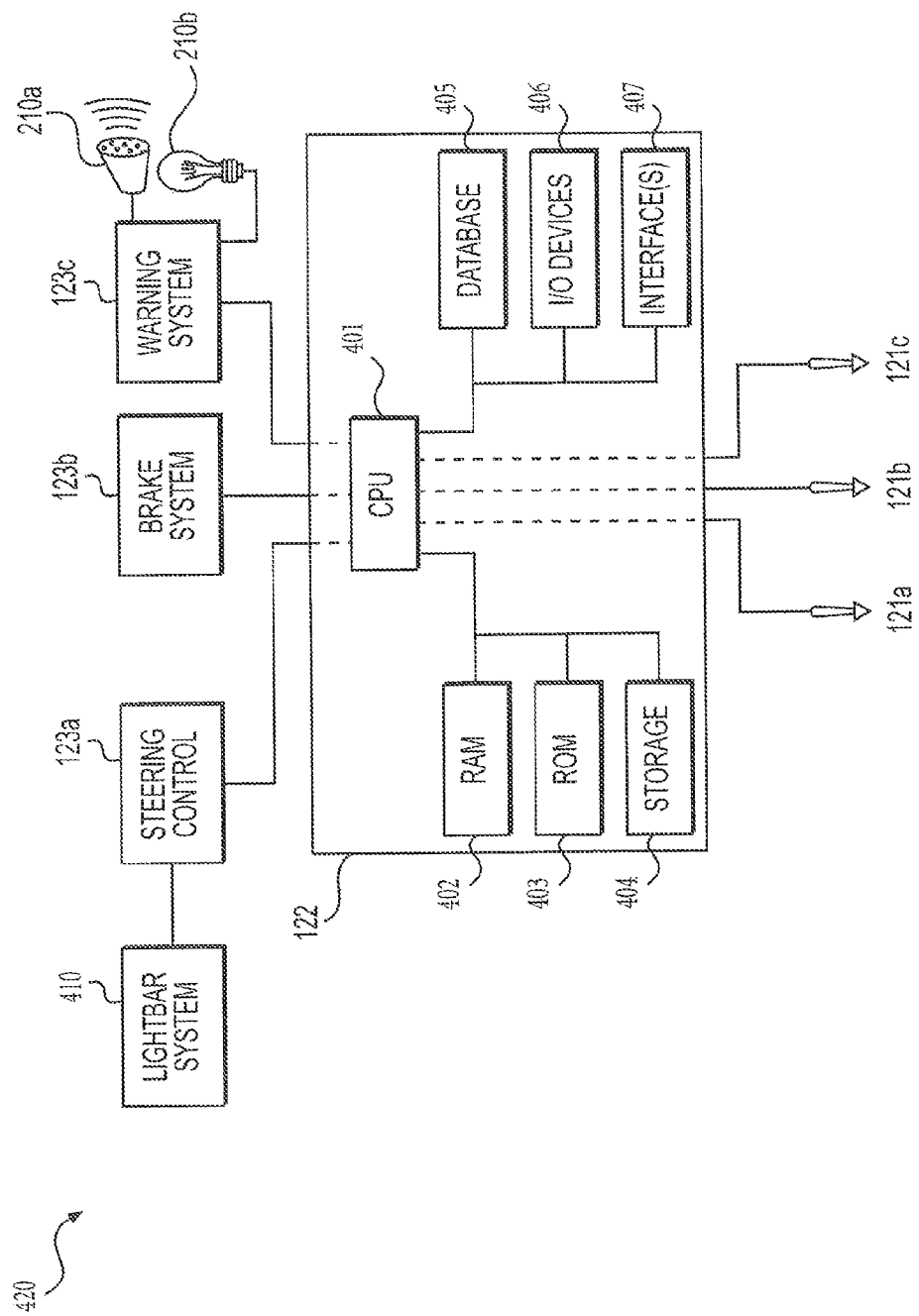
FIG. 4 illustrates a schematic diagram of a vehicle object notification system according to one implementation.

When the logical operations described herein are implemented in software, the process may execute on any type of computing architecture or platform. For example, the functions of the one or more light-emitting elements, controller, control circuitry, and vehicle electronics control unit, as described above, may be implemented on any type of computing architecture or platform. An exemplary implementation illustrated in FIG. 4 provides an example system 420 and computing device such as controller 122 upon which embodiments of the invention may be implemented. The controller 122 may include a bus or other communication mechanism for communicating information among various components of the controller 122. In its most basic configuration, controller 122 typically includes at least one processing unit 401 and system memory. Depending on the exact configuration and type of computing device, system memory may be volatile (such as random access memory (RAM)) 402, non-volatile (such as read-only memory (ROM), flash memory, etc.) 403, or some combination of the two. The processing unit 401 may be a standard programmable processor that performs arithmetic and logic operations necessary for operation of the controller 122.

Controller 122 may have additional features/functionality. For example, controller 122 may include additional storage such as removable and/or non-removable storage 404 including, but not limited to, magnetic or optical disks or tapes. Controller 122 may also contain network connection (s) 407 that allow the device to communicate with other devices. Controller 122 may also have input device(s) or be capable of being connect with input/output devices 406 such as a keyboard, mouse, touch screen, etc. and a display, speakers, printer, etc. The additional devices may be connected to the bus in order to facilitate communication of data among the components of the controller 122. All these devices are well known in the art and need not be discussed at length here.

The processing unit 401 may be configured to execute program code encoded in tangible, computer-readable media. Computer-readable media refers to any media that is capable of providing data that causes the controller 122 (i.e., a machine) to operate in a particular fashion. Various computer-readable media may be utilized to provide instructions to the processing unit 122 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 401 may execute program code stored in the system memory 402, 403. For example, the bus may carry data to the system memory 402, 403, from which the processing unit 401 receives and executes instructions. The data received by the system memory 402, 403 may optionally be stored on the removable/non-removable storage 404 before or after execution by the processing unit 401.

Controller 122 typically includes a variety of computer-readable media. Computer-readable media can be any available media that can be accessed by device 122 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 402, 403, removable/non-removable storage 404 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by controller 122. Any such computer storage media may be part of controller 122.

Further comprising the system 420 of FIG. 4 are other vehicle systems such as, for example, a steering control system 123a, a vehicle braking system 123b, a warning system 123c such as, for example, the vehicles anti-theft/security/alarm system and the like that are in communication with the controller 122. In one aspect, the warning system 123c can further be comprised of audible 210a, visual 210b, haptic devices for making the vehicle operator (or other passengers or persons) aware of the detection of one or more objects relative to a portion of the vehicle. The steering control system can further interact with the lightbar system 410, which includes one or more first light-emitting elements for providing indication and/or warning light signals to the driver of the vehicle corresponding to detection of one or more objects relative to a first portion of the vehicle and one or more second light-emitting elements corresponding to detection of one or more objects relative to a second portion of the vehicle.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 5:
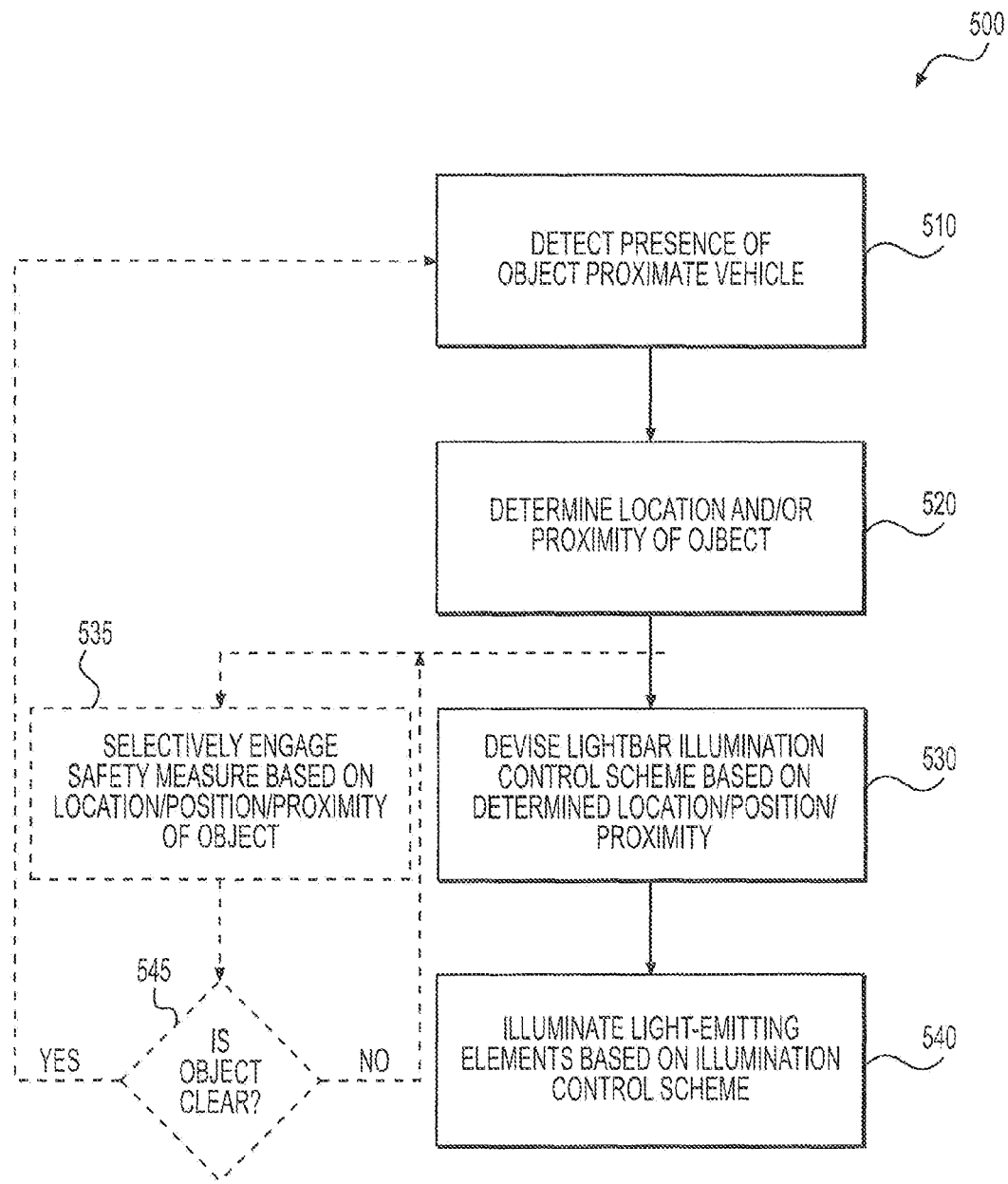
FIG. 5 illustrates a flow chart of a method of controlling a vehicle object notification system according to one implementation.

FIG. 5 illustrates a flow chart of an exemplary method of controlling a vehicle object notification system according to one implementation. Aspects of this implementation may be carried out on the controller 122 described above and in detail in FIG. 4 or on other computing devices. The process begins at 510, where the presence of an object proximate to a vehicle is detected. Systems and methods of detecting the presence of the objects are described herein, particularly in reference to FIGS. 1 and 4. At 520, the location of the detected object relative to the vehicle is determined. Though described in greater detail with reference to FIG. 1, generally this involves determining whether one or more objects are in front of the vehicle, are underneath the vehicle, are behind the vehicle, are to any side of the vehicle, are above the vehicle, are in the vehicle, are on the vehicle, are touching the vehicle, etc. At 530, a lightbar illumination control scheme is determined based on the position or proximity of the detected object relative to the vehicle. For example, the lightbar can comprise a plurality of light-emitting elements such as, for example, a first light-emitting element arranged in an elongated pattern along a first portion of the steering interface and a second light-emitting element arranged in an elongated pattern along a second portion of the steering interface. For instance, the first portion of the steering interface having the first light-emitting element arranged in an elongated pattern can include a rim portion and the second portion of the steering interface having the second light-emitting element arranged in an elongated pattern can include a hub portion. At 540, the light-emitting elements that comprise the lightbar are illuminated in accordance with the control scheme determined at 530. Lighting particular sections of the lightbar using patterns of lighting, colors, frequency, etc. can be used to alert the vehicle's operator as to the location or proximity of the object. For example, lighting elements on the upper rim section of the steering interface may alert the operator that the object is detected in front of the vehicle, whereas lighting the portion in the hub may alert the operator that the object is detected underneath or behind the vehicle. Colors, for example, green, yellow and red, can be used as one of many ways to alert the operator as to the proximity of the object.

Returning to 520, optionally or alternatively, at 535, once the location or proximity of the object has been detected, safety measures on the vehicle may be selectively engaged. For example, if the object is determined to be in front of the vehicle and in close proximity, the braking system of the vehicle may be applied, the engine may be shut down, or the transmission disengaged such that the vehicle cannot move forward. Similarly, the lights of the vehicle may turn on or flash, or a warning noise (e.g., horn) may be emitted by the vehicle. Similar actions can be taken for objects detected underneath, behind, beside or at other locations with respect to the vehicle. The actions taken can be progressive based on proximity. For example, first actions may be to flash the lights or blow the horn. Then, as the vehicle or the object move closer to one another, the brakes may be applied or the transmission disengaged. A third level of action could be to shut down the engine of the vehicle and engage the parking brake. At 545, it is determined whether the object has cleared after the safety measures have been performed. If the object is cleared, then the process returns to 510. If it has not cleared, then the process returns to 535, where additional safety measures may be engaged.

Figure 6:
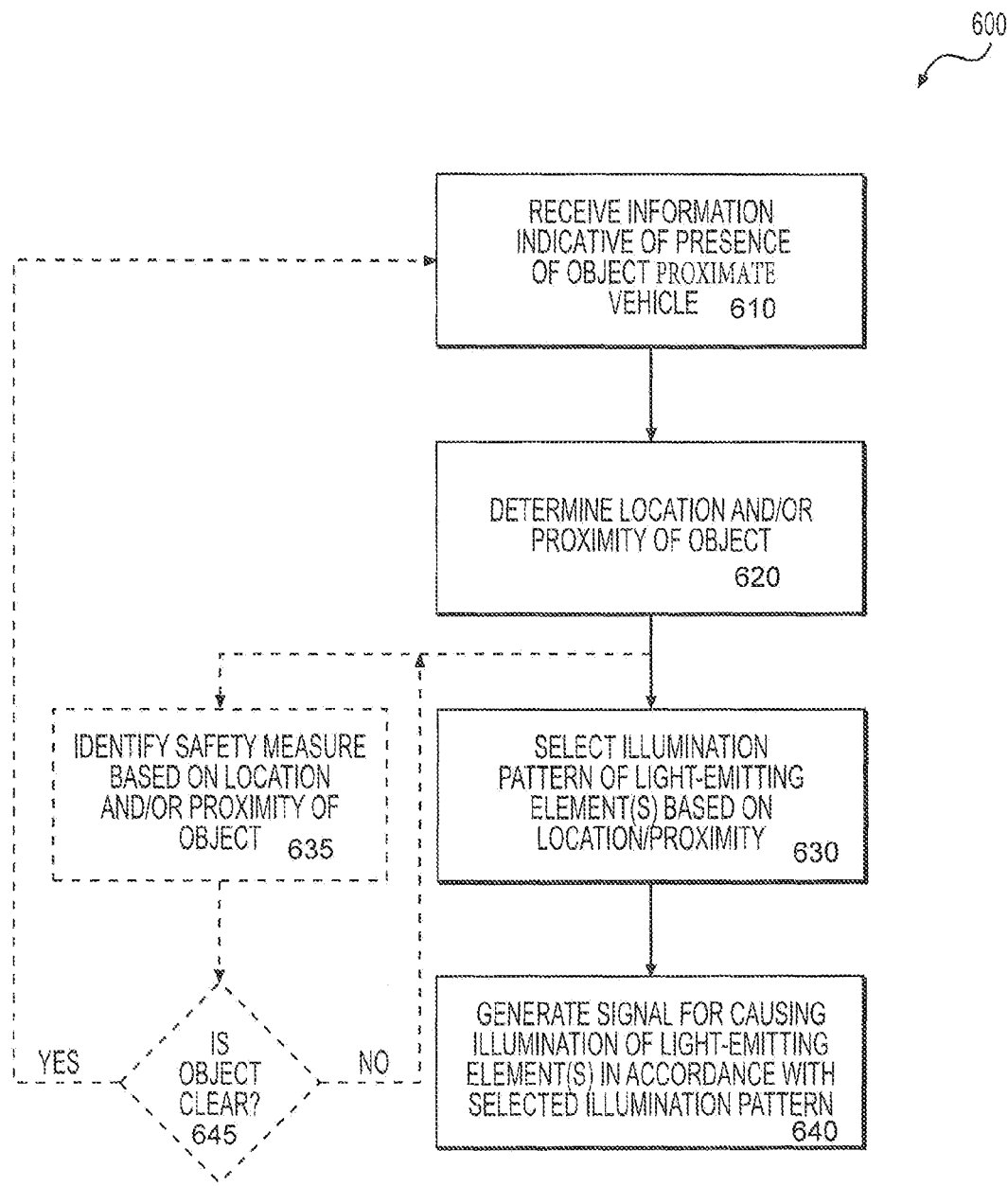
FIG. 6 illustrates a flow chart of a method of controlling a vehicle object notification system according to another implementation.

FIG. 6 illustrates a flow chart of a method 600 of controlling a vehicle object notification system according to another implementation. Aspects of this implementation may be carried out on the controller 122 described above and in detail in FIG. 4, or on other computing devices. The process begins at 610 where information indicative of an object proximate to a vehicle is received. For example, the information could be received by the controller 122. At 620, the location and/or proximity of the object, relative to the vehicle, is determined based on the information received in 610. At 630, an illumination pattern for one or more light-emitting elements located on a steering interface is selected based on the location and/or proximity of the object. For example, a steering interface can comprise a plurality of light-emitting elements such as, for example, a first light-emitting element arranged in an elongated pattern along a first portion of the steering interface and a second light-emitting element arranged in an elongated pattern along a second portion of the steering interface. For instance, the first portion of the steering interface having the first light-emitting element arranged in an elongated pattern can include a rim portion and the second portion of the steering interface having the second light-emitting element arranged in an elongated pattern can include a hub portion. An illumination pattern for the light-emitting elements can include lighting particular sections of the one or more light-emitting elements using patterns of lighting, colors, frequency, etc. can be used to alert the vehicle's operator as to the location or proximity of the object. For example, lighting elements on the upper rim section of the steering interface may alert the operator that the object is detected in front of the vehicle, whereas lighting the portion in the hub may alert the operator that the object is detected underneath or behind the vehicle. Colors, for example, green, yellow and red, can be used as one of many ways to alert the operator as to the proximity of the object. At 640, a signal or signals are generated to cause the one or more light-emitting elements to illuminate in accordance with the illumination pattern selected in 630 to indicate the location and/or proximity of a detected object.

Returning to 620, optionally or alternatively, at 635, once the location or proximity of the object has been detected, safety measures on the vehicle may be identified. For example, if the object is determined to be in front of the vehicle and in close proximity, signals for applying the braking system of the vehicle, shutting the engine down, disengaging the transmission, and the like such that the vehicle cannot move forward can be generated. Similarly, signals for turning on and off the lights of the vehicle, flashing the lights, emitting a warning noise (e.g., horn) by the vehicle and the like may be generated. Similar signals can be generated for objects detected underneath, behind, beside or at other locations with respect to the vehicle. The signals can cause actions to be taken in a progressive manner based on proximity. For example, first actions may be to flash the lights or blow the horn. Then, as the vehicle or the object move closer to one another, the brakes may be applied or the transmission disengaged. A third level of action could be to shut down the engine of the vehicle and engage the parking brake. At 645, it is determined whether the object has cleared after the signals for safety measures have been generated. If the object is cleared, then the process returns to 610. If it has not cleared, then the process returns to 635, where signals for additional safety measures may be generated.

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed implementations are, therefore, to be considered in all respects as illustrative and not restrictive, the scope of the invention being indicated by the appended claims and not limited to the foregoing description.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

What is claimed is:

1. A vehicle object notification system, comprising:
   a steering interface comprising a plurality of light-emitting elements, each of the light-emitting elements arranged in an elongated pattern along a respective portion of the steering interface, wherein a first light emitting element is configured to illuminate based on a detection of an object relative to a first portion of a vehicle and a second light emitting element is configured to illuminate based on a detection of an object relative to a second portion of a vehicle,
   wherein the second light emitting element is arranged in an elongated pattern along a hub portion of the steering interface, the second light emitting element configured to illuminate when the object is located at least one of behind the vehicle or underneath the vehicle.

2. The vehicle object notification system of claim 1, wherein the first light emitting element is arranged in an elongated pattern along a rim portion of the steering interface, the first light emitting element configured to illuminate when the object is located in front of the vehicle.

3. The vehicle object notification system of claim 1, wherein the first light-emitting element includes a plurality of regions, each region configured to selectively illuminate based on a respective location of the object relative to the first portion of the vehicle.

4. The vehicle object notification system of claim 3, wherein the second light-emitting element includes a plurality of regions, each region configured to selectively illuminate based on a respective location of the object relative to the second portion of the vehicle.

5. A vehicle object notification system, comprising:
   a steering interface;
   at plurality of light-emitting elements coupled to the steering interface, a first one of the plurality of light-emitting elements arranged in an elongated pattern along a rim portion of the steering interface and a second light-emitting element arranged in an elongated pattern along a hub portion of the steering interface;
   a controller communicatively coupled to the plurality of light-emitting elements and configured to:
   receive information indicative of an object detected proximate the vehicle;
   determine a first location of the object relative to a first portion of the vehicle, based on the received information;
   provide, to the first light-emitting element arranged in an elongated pattern along the rim portion of the steering interface, a first control signal for illuminating the first light-emitting element according to an illumination pattern, the illumination pattern based on the first location of the object;
   determine a second location of the object relative to a second portion of the vehicle, based on the received information; and
   provide, to the second light-emitting element arranged in the elongated pattern along the hub portion of the steering interface a second control signal for illuminating the second light-emitting element according to a second illumination pattern, the second illumination pattern based on the second location of the object, wherein the second location comprises at least one of an area behind the vehicle or underneath the vehicle.

6. The vehicle object notification system of claim 5, wherein the first location comprises an area in front of the vehicle.

7. The vehicle object notification system of claim 5, wherein the first light-emitting element includes a plurality of regions, each region configured to selectively illuminate based on a respective location of the object relative to the first portion of the vehicle.

8. The vehicle object notification system of claim 5, wherein the second light-emitting element includes a plurality of regions, each region configured to selectively illuminate based on a respective location of the object relative to the second portion of the vehicle.

9. A vehicle, comprising:
   one or more ground-engaging devices;
   a steering interface, coupled to one or more ground-engaging devices and comprising a rim portion and a hub portion, the rim portion configured for grasping by an operator of the vehicle;
   a first light-emitting element coupled to the steering interface, the first light-emitting element arranged in an elongated pattern along at least a portion of the rim portion of the steering interface;
   a second light-emitting element coupled to the steering interface, the second light-emitting element arranged in an elongated pattern along at least a portion of the hub portion of the steering interface;
   a controller communicatively coupled to the first light-emitting element and the second light-emitting element configured to:
   receive information indicative of an object detected proximate the vehicle;
   determine the location of the object relative at a portion of the vehicle, based on the received information; and
   providing, to at least one of the first light-emitting element and the second light-emitting element, a control signal for illuminating the at least one of the first light-emitting element and the second light-emitting element according to an illumination pattern, the illumination pattern based on the location of the object, wherein the control signal is provided to the second light-emitting element when the location of the object is behind or underneath the vehicle.

10. The vehicle of claim 9, wherein determining the location of the object relative to the portion of the vehicle includes determining the location of the object is in a first location relative to the portion of the vehicle, and wherein providing the control signal to the at least one light-emitting element includes providing the control signal to the first light-emitting element.

11. The vehicle of claim 10, wherein the first location comprises an area in front of the vehicle.

12. The vehicle of claim 10, wherein determining the location of the object relative to the portion of the vehicle includes determining the location of the object is in a second location relative to the portion of the vehicle, and wherein providing the control signal to the at least one light-emitting element includes providing the control signal to the second light-emitting element.

13. The vehicle of claim 12, wherein the second location comprises at least one of an area behind the vehicle or underneath the vehicle.

14. The vehicle of claim 9, wherein the first light-emitting element includes a plurality of regions, each region configured to selectively illuminate based on a respective location of the object relative to a first portion of the vehicle.

15. The vehicle of claim 9, wherein the second light-emitting element includes a plurality of regions, each region configured to selectively illuminate based on a respective location of the object relative to a second portion of the vehicle.

\* \* \* \* \*